United States Patent Office 3,164,515
Patented Jan. 5, 1965

3,164,515
METHOD OF COMBATING NEMATODES WITH ARYL ISOCYANIDE DIHALIDES
Bernhard Homeyer, Opladen, Engelbert Kühle, Cologne-Stammheim, and Hugo Malz, Leverkusen-Wiesdorf, Germany, assignors to Farbenfabriken Bayer Aktiengesellschaft, Leverkusen, Germany, a corporation of Germany
No Drawing. Filed May 15, 1962, Ser. No. 194,969
Claims priority, application Germany May 30, 1961
7 Claims. (Cl. 167—30)

The present invention relates to and has as its objects new and useful nematode control agents which contain as active ingredients isocyanide dihalides of the general formula

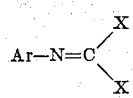

in which Ar is an optionally substituted aromatic radical and X is chlorine or bromine. These new nematocidal agents possess a good plant tolerance.

Compounds of the abovementioned formula suitable for nematode control are e.g. phenyl-isocyanide dichloride, phenyl-isocyanide dibromide, 4-chlorophenyl-, 2,4-dichlorophenyl-, 4-nitrophenyl-, 4-bromophenyl-, 2-methyl-4-chloroisocyanide dichloride, 4-chloronaphthyl-(1)-isocyanide dichloride and phenylene-(1,4)-bis-isocyanide dichloride or the corresponding dibromides.

The inventive compounds are either known or may be prepared to methods known in principle. In the literature the following ways are described to prepare aromatic isocyanide dihalides:

By chlorination of aromatic mustard oils (see E. Sell and G. Zierold: Berichte 7, 1228 (1874);

By addition of halogen to isonitriles (see J. U. Nef Annalen 270, 267 (1892) and Annalen 280, 291 (1894).

Recently a new elegant method has been described which consists in chlorination of formanilides in thionyl chloride, whereby also isocyanide dihalides may be obtained (see German patent specification 1,094,737).

The compounds to be applied according to the invention can be used as spraying or pouring agent for the surface of the soil infested to be protected, and then worked in. After a refraining period from cultivation of 3 to 4 weeks the treated soil can be sown or planted.

If the compounds are used as dust formulations these dust formulations may be prepared by admixing the active ingredient with suitable inert extenders such as talc, chalk, bentonite, fuller's earth and the like. Liquid formulations may be prepared by admixing the active material with any suitable inert diluents; especially suitable are lower aliphatic chlorinated hydrocarbons such as chloroform, halogenated propanes, propenes and the like.

The good nematocidal power of the new compounds according to the invention is apparent from the following experiments:

Example

The compounds mentioned below were tested against root gall nematodes *Meloidogyne incognita*. Each time 1 l. of infected soil was treated with 25, 50, 100 and 200 p.p.m. of these substances. The application of the substances was carried out as a 1% formulation in talc, which was intimately mixed with the soil. A week after the application all the treated samples were sown with lettuce. The latter was evaluated after 4 weeks for gall formation. In the following table the activities in percent are given for each applied amount. Each figure is a mean value from two tests.

| Formula | 25 p.p.m. Percent | 50 p.p.m. Percent | 100 p.p.m. Percent | 200 p.p.m. Percent |
|---|---|---|---|---|
| Cl—⌬—N=CCl₂ | 100 | 100 | 100 | 100 |
| Cl—⌬(Cl)—N=CCl₂ | 80 | 95 | 100 | 100 |
| Cl—⌬(Cl,Cl)—N=CCl₂ | 0 | 50 | 100 | 100 |
| ⌬(Cl)—N=CCl₂ | 95 | 100 | 100 | 100 |
| ⌬—N=CCl₂ | 50 | 100 | 100 | 100 |
| Br—⌬—N=CCl₂ | 95 | 100 | 100 | 100 |
| Br—⌬(Br)—N=CCl₂ | 50 | 98 | 100 | 100 |
| Cl—⌬(CH₃)—N=CCl₂ | 0 | 80 | 100 | 100 |
| CCl₂=N—⌬—N=CCl₂ | 0 | 0 | 50 | 98 |
| Cl—⌬(Cl,Cl)—N=CCl₂ | 90 | 100 | 100 | 100 |

We claim:
1. Method of combating nematodes which comprises applying to soil an isocyanide-dihalide of the formula

$$\left[ Ar-N=C\begin{smallmatrix}X\\X\end{smallmatrix} \right]_n$$

in which Ar is a member selected from the group consisting of phenyl, lower alkyl-substituted phenyl, chloro-substituted phenyl and bromo-substituted phenyl, X is a member selected from the group consisting of chlorine and bromine and $n$ is 1 to 2.

2. A method of combating nematodes which comprises applying to soil an active amount of a compound having the formula

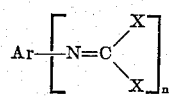

3. A method of combating nematodes which comprises applying to soil an active amount of a compound having the formula

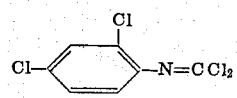

4. A method of combating nematodes which comprises applying to soil an active amount of a compound having the formula

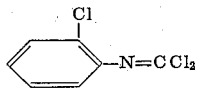

5. A method of combating nematodes which comprises applying to soil an active amount of a compound having the formula

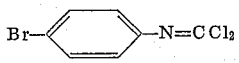

6. A method of combating nematodes which comprises applying to soil an active amount of a compound having the formula

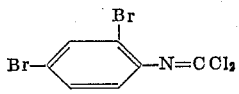

7. A method of combating nematodes which comprises applying to soil an active amount of a compound having the formula

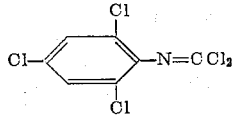

References Cited in the file of this patent

FOREIGN PATENTS 1,094,937     Germany _____ Dec. 15, 1960

OTHER REFERENCES

Chem. Abst., vol 53, page 18017; vol. 36, page 3491; vol. 35, page 442; vol. 34, pages 2806, 2807, 3492. Patent Office Scientific Library.

Berichte 7, 1228 (1874).

Annalen 270, 267 (1892); 280, 291 (1894).